United States Patent [19]

Wu

[11] Patent Number: 5,568,652
[45] Date of Patent: Oct. 22, 1996

[54] RAPID SETTING COMPOSITIONS AND METHOD OF MAKING AND USING SAME

[75] Inventor: Shy-Hsien Wu, Horseheads, N.Y.

[73] Assignee: Corning Incorporated, Corning, N.Y.

[21] Appl. No.: 344,969

[22] Filed: Nov. 25, 1994

[51] Int. Cl.$^6$ ....................................................... B22F 3/10
[52] U.S. Cl. ..................... 419/2; 419/5; 419/41; 419/38; 75/246; 264/62; 264/63; 264/441; 501/89
[58] Field of Search ................... 264/63, 62, 25, 264/441; 419/36, 2, 5, 41, 38; 75/246; 501/89

[56] References Cited

U.S. PATENT DOCUMENTS

| | | | |
|---|---|---|---|
| 3,885,977 | 5/1975 | Lachman et al. | 106/62 |
| 4,518,704 | 5/1985 | Okabayashi et al. | 502/80 |
| 4,673,658 | 6/1987 | Gadkaree et al. | 501/89 |
| 4,758,272 | 7/1988 | Pierotti et al. | 75/246 |
| 4,992,233 | 2/1991 | Swaroop et al. | 419/2 |
| 5,028,362 | 7/1991 | Janney et al. | 264/25 |
| 5,145,908 | 9/1992 | Jenny et al. | 524/827 |
| 5,183,608 | 2/1993 | Guile | 264/44 |
| 5,252,272 | 10/1993 | Yavuz et al. | 264/62 |
| 5,340,516 | 8/1994 | Yavuz et al. | 264/63 |
| 5,409,660 | 4/1995 | Alpha et al. | 419/5 |
| 5,427,601 | 6/1995 | Harada et al. | 75/235 |

FOREIGN PATENT DOCUMENTS

| | | |
|---|---|---|
| 0019674A1 | 12/1980 | European Pat. Off. . |
| 0488716A1 | 6/1992 | European Pat. Off. . |
| 49-115110 | 11/1974 | Japan . |
| 57-122924 | 7/1982 | Japan . |
| 7-69711 | 7/1993 | Japan . |

OTHER PUBLICATIONS

Bulletin, Dow Chemical Company, Designed Products Dept., Midland, MI, Form No. 192–674–78, pp. 1–1.
Bulletin, Dow Chemical Company, Designed Products Dept., Midland, MI, Form No. 192–678–78, pp. 3–3.
Bulletin, Dow Chemical Company, Designed Products Dept., Midland, MI, Form No. 192–687–78, pp. 6–11.

*Primary Examiner*—Charles T. Jordan
*Assistant Examiner*—Daniel Jenkins
*Attorney, Agent, or Firm*—L. Rita Quatrini

[57] ABSTRACT

A method of making a homogeneous formable mixture involves simultaneously mixing organic binder which can be cellulose ethers, cellulose ether derivatives, and combinations of these, powder material capable of being formed into a body when combined with the organic binder, water-insoluble wax, and vehicle of which at least about 90 wt % is water, at a temperature which is at least as high the temperature at which the wax begins to deform under shear. A method of making a shaped body involves shaping the above-described mixture into a green body, followed by drying and heating the green body at a temperature and for a time sufficient to form the product body. Preferably the mixture is extruded at a temperature between room temperature and the melting point of the wax, into a honeycomb. The honeycomb has no voids and a smooth skin. A formable mixture made up of organic binder, powder, and wax as described above, wherein the wax which makes up at least 3 wt. % as a superaddition based on the inorganic solid components in the mixture.

21 Claims, No Drawings

RAPID SETTING COMPOSITIONS AND METHOD OF MAKING AND USING SAME

The present invention relates to mixtures of powders carried in an aqueous vehicle, and a cellulose ether binder, and to the method for forming a body from the mixtures. The mixtures when formed into a body set up easily and in relatively shorter time than has been possible up to now. This rapid setting feature has the advantage of dimensionally stable greenware which can be easily handled without deforming. These rapid setting characteristics are due to a wax in the forming mixture which insoluble in water.

BACKGROUND OF THE INVENTION

Powder mixtures having a cellulose ether binder are used in forming articles of various shapes. For example ceramic or metal powder mixtures are formed into honeycombs which are used as substrates in catalytic and adsorption applications. The mixtures must be well blended and homogeneous in order for the resulting shaped body to have good integrity in size and shape and uniform physical properties. The mixtures have organic additives in addition to the binders. These additives can be surfactants, lubricants, and dispersants and function as processing aids to enhance wetting thereby producing a uniform batch.

Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

In injection molding, a ceramic batch can be classified roughly into two categories: a non-aqueous batch with solvent, soluble binders, and additives; and an aqueous batch with water soluble or dispersible binders.

In general an aqueous batch is harder or slower to set up than a non-aqueous one. But a non-aqueous batch has the disadvantage of using solvent(s) which cause environmental problems and require costly facilities to process.

Up to this time it has always been accepted that an aqueous cellulose ether batch will not be compatible with any hydrophobic additive. The only practical way to introduce a substantial amount of hydrophobic material to an aqueous ceramic batch at low temperature (room temperature) is by an aqueous emulsion or dispersion of that material. Since no large temperature difference is involved in such addition, the unique melting/solidifying feature of a hydrophilic material cannot be realized in a ceramic batch. Moreover, there is always the question concerning the distribution and effectiveness of discrete hydrophobic particles in an aqueous environment.

It would be advantageous to improve the setting up characteristics of formable mixtures. It would be a distinct advantage from an environmental and cost standpoint to be able to use aqueous batches. Therefore a method to improve the setting up characteristics of aqueous batches so they would set up easier and faster would be highly desirable and an advancement in the art.

SUMMARY OF THE INVENTION

In accordance with one aspect of the invention, there is provided a method of making a homogeneous formable mixture which involves simultaneously mixing organic binder which can be cellulose ethers, cellulose ether derivatives, and combinations of these, powder material capable of being formed into a body when combined with the organic binder, water-insoluble wax, and vehicle of which at least about 90 wt % is water, at a temperature which is at least as high the temperature at which the wax begins to deform under shear.

In accordance with another aspect of the invention, there is provided a method of making a shaped body which involves shaping the above-described mixture into a green body, followed by drying and heating the green body at a temperature and for a time sufficient to form the product body. Preferably the mixture is extruded at a temperature between room temperature and the melting point of the wax, into a honeycomb structure. The honeycomb has a smooth skin and no voids.

In accordance with another aspect of the invention, there is provided a homogeneous formable mixture which is made up of powder, organic binder, and wax as described above, wherein the wax makes up at least 3 wt. % as a superaddition based on the inorganic solid components in the mixture.

DETAILED DESCRIPTION OF THE INVENTION

The present invention relates rapid-setting wet forming mixtures of powder material having a water soluble organic binder of cellulose ether and/or its derivatives carried in an aqueous vehicle. A wax, which can also mean a mixture of such waxes which is essentially insoluble in water is incorporated directly into these mixtures. As a result, the mixtures set up easier and faster than they would otherwise in the forming operation.

The mixture composition is made up of powder particles which are most typically ceramic, glass ceramic, glass, metal, molecular sieve, carbon, and combinations of these, the organic binder, vehicle, and wax which is insoluble in water. Optional components such as plasticizers, surfactants, and lubricants can also be added.

The powder materials are those which when combined with the organic binder can be shaped into a body. In general, the powder material is fine powder (in contrast to coarse grained materials) some components of which can either impart plasticity, such as clays, when mixed with a vehicle such as water, or which when combined with the organic binder can contribute to plasticity.

Ceramic, glass ceramic and glass ceramic powders are also meant to include those materials which when fired include as a predominant phase: ceramic, glass-ceramic, glass, and combinations thereof. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™, calcined clay, having a particle size of about 1–3 micrometers, and a surface area of about 6–8 $m^2/g$, such as Glomax LL. All of the above named materials are sold by Dry Branch Kaolin, Dry Branch, Ga.

Some typical kinds of talc are those having a particle size of about 6–8 micrometers, and a surface area of about 5–8 $m^2/g$, such as Pfizer talc 95-27, and 95-28.

Some typical aluminas are coarse aluminas, for example, Alcan C-700 series, such as those having a particle size of about 4–6 micrometers, and a surface area of about 0.5–1 $m^2/g$, eg., C-701™ fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

In burnout-containing mixtures, particularly graphite-containing mixtures at the above described levels, it is sometimes advantageous for ram extrusion to include polyvinyl alcohol as co-binder in addition to the organic binder, e.g. methylcellulose and/or methylcellulose derivatives. It is advantageous to have about 2% to about 4% by weight polyvinyl alcohol. It is especially advantageous to have about 2% to about 4% by weight polyvinyl alcohol, and about 4% to about 6% methylcellulose and/or methylcellulose derivatives.

One especially advantageous composition for ram extrusion of a body for filter applications is as follows: about 25% to about 35% by weight graphite based on the powder material, as a burnout agent, water, and in percent by weight based on the powders and the burnout agent, about 2% to about 8% organic binder which can be methylcellulose, methylcellulose derivatives, and combinations thereof, about 0.5% to about 2.5% sodium stearate and about 0.3% to about 1.0% oleic acid as a lubricant. Especially suited with this composition is to have about 2% to about 4% polyvinyl alcohol as co-binder, and about 4% to about 6% by weight organic binder.

Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

Some compositions of carbon for making activated carbon bodies are known in the art. They contain activated carbon particles, and a binder or binders such as disclosed in U.S. Pat. No. 4,518,704, JP 57-122924 (1982), and 49-115110 (1974) which are hereinincorporated by reference. These disclosures relate to bodies containing or made of activated carbon in which clay binders are used.

Some especially suited carbon compositions to which a wax can be added are given in U.S. application Ser. No. 08/304,533, filed Sep. 12, 1994, which is herein incorporated by reference as filed.

Some especially suited carbon compositions are as follows: about 2% to 10% organic binder, 0 to about 4% of polyvinyl alcohol, about 5% to 40% bentonite clay, about 10% to 50% silicone resin, vehicle, and the balance of the mixture being activated carbon particles. The vehicle can be water, or water and any one or combination of the following: oleic acid, oleic acid derivatives, linoleic acid, and linoleic acid derivatives. If components other than water are used in the vehicle, they do not constitute more than about 10% of the vehicle.

The invention is suitable for use with metal powders. Any sinterable metal or metal composition can be used in the practice of the present invention. Especially suited are iron group metal, chromium, and aluminum compositions, with the preferred iron group metal being iron. Especially preferred is Fe, Al, and Cr. For example, FeS-20Al5-40Cr, and Fe7-10Al10-20Cr powders with other possible additions are especially suited. Some typical compositions of metal powders are disclosed in U.S. Pat. Nos. 4,992,233, 4,758,272, and European patent application publication no. 488716A1, which are herein incorporated by reference as filed. U.S. Pat. No. 4,992,233 relates to methods of producing porous sintered bodies made from metal powder compositions of Fe and Al with optional additions of Sn, Cu, and Cr. European patent application publication no. 488716A1 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe-Cr-Al- (Y, lanthanide series elements, Zr, Hf, or Cu) alloy powder, Cr-Al-(Y, lanthanide series elements, Zr, Hf, or Cu) alloy powder, Fe-B, Fe-Si powder, etc.

The weight percents of the organic binder, wax, and vehicle are calculated as superadditions with respect to the non-organic solids by the following formula:

$$\frac{\text{weight of binder, wax or vehicle}}{\text{weight units of non-organic solids}} \times 100.$$

The organic binder contributes to the plasticity of the mixture for shaping into a body. The plasticizing organic binder according to the present invention refers to cellulose ether binders. According to this invention, the term "cellulose ether" means cellose ethers as well as their derivatives. Some typical organic binders according to the present invention are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. This can include a mixture of different types of methylcellulose and/or different types of hydroxypropyl methylcellulose. For example, it has been found that a mixture of methylcellulose and hydroxypropyl cellulose results in good ware properties. Likewise a mixture of hydroxypropyl methylcellulose binders wherein one such hydroxypropyl methylcellulose has a methoxyl content of about 27–30 wt. % and another hydroxypropyl methylcellulose has a methoxyl content of about 19–25 wt. %, most typically but not necessarily in a 1:1 weight ratio, also results in good ware properties. Preferred sources of cellulose ethers and/or derivatives thereof, are Methocel A4M, F4M, F40M, and K75M from Dow Chemical Co. Methocel A4M is a methylcellulose binder having a thermal gel point of about 50° C., and a gel strength of 5000 g/cm$^2$ (based on a 2% solution at 65° C.). Methocel F4M, F40M, and K75M are hydroxypropyl methylcellulose. Methocels F4M and F40M have thermal gel points of about 54° C. Methocel K75M has a gel point of about 70° C. Methocel K75M has a methoxyl content of about 19–25 wt. %; and the Methocels F have a methoxyl content of about 27–30 wt. %. A combination of A4M and F40M Methocels, and a combination of K75 and F40M Methocels have been found to enhance the rapid setting effect. These combinations reduce or eliminate distortion during the drying step. Information on the Methocels is given in Form No. 192-674-78, page 1.1, Form 192-678-78, page 3.3, and Form 192-687-78, page 6.11 all by Dow Chemical Co., which are herein incorporated by reference.

Other binder components can be present such as polyvinyl alcohol.

The organic binder content, especially when the organic binder is methylcellulose and/or its derivatives, is advantageously about 2% to about 10%, more advantageously about 2.5% to about 8% and most advantageously about 2.5% to about 4.5%.

The water-insoluble wax or wax mixtures must be able to melt completely under the shear conditions of a mixer at an elevated temperature. The shear energy sometimes can induce a wax to melt below its melting point. Nevertheless, it is advantageous that the water-insoluble wax must have a melting point which is no higher than the thermal gelling point of the cellulose ether binder. If high melting waxes are used, that is, waxes having a melting point that is higher than the thermal gelling point of the cellulose ether binder, plasticizer can be added to lower its melting point and the point at which it begins to soften or deform. For example, one type of polyethylene wax, polywax 500 from Petrolite has a melting point of about 88° C. which is higher than the thermal gelling point of the cellulose ether binders. However, this wax is very suitable for the purposes of the present invention when a plasticizer is used. Some suitable plasticizers are modified polyethylene waxes such as Vybar 825 from Petrolite, or dioctyl phthalate, or butyl ricinoleate such as Flexricin P-3 from CasChem Inc.

Besides lowering the melting point of a wax, a plasticizer also enhances the rheology of the mixture. Therefore it can be included in mixtures having waxes with melting points which do not have to be lowered to enhance the rheological properties of the mixture, provided that it does not lower the melting point of the wax so much that the wax loses its rapid setting properties.

The waxes can be both natural and synthetic.

Some natural waxes that can be used are paraffin, microcrystalline, mineral, vegetable such as carnauba, or animal waxes such as beeswax for example. Synthetic waxes include fatty alcohols such as hexadecanol, and octadecanol, fatty acids, such as palmitic acid, myristic acid, fatty acid esters, such as mono or di ethylene or propylene glycol mono or di stearates, polyethylene glycol stearates, glycerides such as glyceryl mono, di, or tri stearates, polyethylene wax, hydrogenated oils, ketones, amines, amides, chlorinated waxes, synthetic hydrocarbon wax, metallic soap e.g. zinc stearate, and mixtures of these. Especially suited are fatty alcohols such as hexadecanol, octadecanol, fatty acids such as palmitic and myristic acids, fatty acid esters such as ethylene or propylene glycol monostearates, paraffin wax, microcrystalline wax, polyethylene wax, and mixtures of these.

With an aqueous vehicle, a compatible hydrophilic wax would normally be chosen to be used, such as e.g. with cordierite and a cellulose ether binder. However, the presence of water destroys the melting point characteristics of a water-soluble wax such as Carbowax making water soluble waxes unsuitable candidates for the practice of this invention, which relies on the wax having a stable melting point and being insoluble in water.

A hydrophobic wax was found to be compatible with powder mixtures containing cellulose ether and/or derivatives and can be added directly, (i.e. all components mixed at once) to these components at an elevated temperature to impart a strong rapid-setting feature to a body produced from the mixture at or near room temperature. The dual role of the cellulose ether and/or derivative, i.e., the water solubility and yet compatibility with water-insoluble materials is the key to the present invention.

The wax content can vary as necessary to obtain a homogeneous batch for the desired rapid-setting effect. This amount is usually at least about 3%. For all practical purposes the wax content is generally not over 60 wt. %.

The vehicle content can vary depending on the type of materials to impart optimum handling properties and compatibility with other components in the mixture. From a practical standpoint, with a water vehicle, the water content is usually about 30% or above. Furthermore, if water evaporation loss is significant during mixing and forming stages, e.g. extrusion, some make-up water has to be added.

The above described plastically deformable mixture can be used in any type of forming operation in which the mixture is shaped into a green body. However, it is especially advantageous in extrusion and injection molding operations which can be any of those known in the art.

For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

Based on the good flowability properties of the mixture at elevated temperature, and excellent rapid-setting properties when cooled, very clean burn-off and normal sintering with low shrinkage (about 4%) the mixtures are suited for injection molding operations. An aqueous injection moldable batch has many advantages over a solvent or non-aqueous batch as discussed previously.

The resulting shaped green body is then dried to remove excess moisture. The drying can be by air, or steam or dielectric drying which can be followed by air drying.

The best drying procedure for ceramics, glass ceramic, glass or molecular sieve is a combination of a short dielectric drying (<4 minutes) followed by oven drying at about 100° C. overnight (10–12 hr) to obtain a blister-free and distortion-free dried product.

For carbon or activated carbon bodies, the drying step involves a humidity control procedure which can be preceded by microwave drying to remove a portion of the vehicle.

Generally the humidity control procedure involves heating the body from about 35° C. to about 95° C. while the relative humidity is maintained at about 90–95% over a period of about 2 to 14 hours, and thereafter lowering the temperature and relative humidity gradually over a length of time to accomplish the drying.

Typically the relative humidity control procedure is carried out according to the following schedule.

| Step | T °(C.) | RH (%) | t (hrs.) |
|---|---|---|---|
| 1 | 35–90 | 90–95 | 1–7 |
| 2 | 88–95 | 90–95 | 1–7 |

After steps 1 and 2, it is preferred to carry out the following additional steps:

| | | | |
|---|---|---|---|
| 3 | 90–95 | 90–80 | 2–6 |
| 4 | 90–95 | 80–70 | 2–6 |
| 5 | 90–60 | 70–60 | 2–6 |
| 6 | 60–30 | 60 | 2–6 |

For carbon bodies, the green body can be preferably pre-dried under microwave radiation for a length of time immediately prior to arcing. The length of time can be determined experimentally and will depend on sample size and on the particular oven.

For metal bodies, induction drying followed by oven drying (100° C. overnight) is used.

The dried body is then heated or fired to form the final product body. The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the firing times are from about 1 hour to about 6 hours. For mixtures that are primarily for forming mullite, the temperatures are from about 1400° C. to about 1600° C., and the firing times are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For carbon bodies, the temperatures are about 1000° C. to 1300° C. in a non-reacting atmosphere e.g nitrogen. Firing times depend on factors as discussed above but are typically about 1 to 8 hours. For zeolite bodies, the temperatures are about 400° C. to 1000° C. in air. Firing times depend on factors as discussed above but are typically about 4 hours.

The bodies according to the present invention can have any convenient size and shape. However, the process is especially suited to production of cellular bodies such as honeycombs. Cellular bodies find use in a number of applications such as catalyst carriers, filters such as diesel particulate filters, molten metal filters, regenerator cores, etc. Extruded honeycombs made according to this invention have no voids and smooth skins.

Some examples of honeycombs produced by the process of the present invention, although it is to be understood that the invention is not limited to such, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm² (about 200 cells/in²), or those having about 15 cells/cm² (about 100 cells/in²). Typical wall thicknesses are for example, about 0.15 mm (about 6 mils) for about 62 cells/cm² (about 400 cells/in²) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/cm² (about 100 to about 200 cells/in²) and about 0.30 to about 0.64 mm (about 12 to about 25 mil) wall thicknesses are especially suited for diesel particulate filter applications.

Some compositions of the present invention are especially useful in forming particular types of honeycomb bodies. This will be shown in the examples that follow.

To more fully illustrate the invention, the following non-limiting examples are presented. All parts, portions, and percentages are on a weight basis unless otherwise stated.

Examples with hexadecanol (mp 50° C.) (Henkel)

Example 1 (Inventive)

A mixture or batch was made up composed of oxide powder material which was composed of about 40.2% Talc 95- 28, about 21.2% Glomax LL, about 25.1% Hydrite MP, and about 13.5% Alcan C701 with a superaddition of about 3% Methocel K75M. The oxides and Methocel were premixed in a turbula mixer for about 30 minutes. The powders were then introduced with about 40% (superaddition) hexadecanol wax as flakes, and about 35% water into a stainless steel vessel and agitated thoroughly. The components were then transferred to a Brabender which was pre-heated to about 50° C. (about 122° F.) for a thorough mixing. A wax containing batch appeared to be uniform after a +2 minute (beyond the peak torque) mixing with temperature recovering from about 110° F. at the peak to about 125° F. at the end of the +2 minutes and torque decreasing from about 5100 m-g (at peak) to about 2500 m-g (+2). This well-mixed batch was extruded through a ram extruder at about 54° C. (about 130° F.) to yield about 2.54 cm (1") diameter samples which were dried dielectrically or in an oven at about 100° C.

It was established that it would take about 15 minutes to warm up the center of a batch in a 6.4 cm (2.5") ram to come to within about 1° F. of the skin (where a batch was heated from the inner wall of a ram). Therefore a warmup of about 15 minutes under vacuum for a batch in a heated ram was added before extrusion. The ram temperature was maintained at about 130° F. during extrusion. A honeycomb product having about 47 cells/cm²/0.26 mm wall/0.28 mm skin/2.54 cm diameter (about 300 cpsi/10.5 mil wall/11 mil skin/1" diameter) with good skin and knitting quality was obtained from that batch extruded in a ram extruder at 54° C. As a sample left an extruder, it immediately set up at room temperature due to the solidification of the wax. This rapid-setting feature was checked by squeezing a section of the honeycomb between the fingers along 90° and especially the weaker 45° cell directions. The sample was dried in a dielectric oven for about 8 minutes, or at about 100° C. in an oven or at room temperature. A dried sample (containing roughly 54% vol. wax) was sintered successfully (about 1400° C.—10 hr in air) with a normal shrinkage of about 4% and no evidence of distortion.

Example 2 (Inventive)

The same procedure as in Example 1 was followed except that the wax content in the mixture was about 60%. Good mixing and extrusion results were obtained with an even stronger rapid-setting effect observed here. A dried sample contained about 63% vol. wax (volume in total mixture).

Example 3 (Inventive)

The same procedure as in Example 1 was followed except F40M Methocel was used (gel point 54° C.). The rapid-setting effect was slightly stronger than in Example 1 (set up faster). A dielectric drying (8 minutes) was suitable for this binder (no blistering, no distortion).

Example 4 (Inventive)

The same procedure as in Example 1 was followed except F40M/A4M Methocel (gel point 48° C.) 1/1 weight ratio was used. This sample showed a better rapid setting result than each of those binders used above, and reconfirmed the usefulness of dielectric drying observed in Example 3.

Example 5 (Inventive)

The same procedure as in as Example 1 was followed except the batch was extruded through a 62 cells/cm²/ 0.15mm thick wall/0.15mm skin (400 cpsi/6 mil wall/6 mil skin) die. The quality of the greenware was good (good skin and cell knitting). The greenware showed a good rapid-setting effect and could be dried dielectrically.

Example 6 (Inventive)

The same wax composition of Example 1 was used in three batches except mixing was done in a Brabender for 4 minutes (sample (1)) or 8 minutes (sample (2)), or 7 minutes (sample (3)). In samples (1) and (2) the Brabender was set at about 50° C. (mp of wax), and in sample (3) at about 55° C. (>mp). It was found that a wax could be mixed thoroughly up to about 8 minutes in a Brabender set at the melting point of the wax. But when the Brabender was set above the melting point of the wax as in sample (3), the batch would develop a wax separation problem. This was evidenced by visible pockets of molten wax in the mixture. The ware quality of the batches with extended mixing, (8 minutes) (sample (2)), was much better than that with the shorter 2 minute mixing as in Example 1. A wax separated batch yielded a poor quality. But even an extended mixing batch (2) also tended to blister when dried in a dielectric oven. The best drying condition for these wares was the use of a combined dielectric and conventional ovens. Samples were first dried dielectrically for about 4 minutes to stiffen sufficiently but without blistering, followed by drying in a 100° C. oven overnight to complete the drying without distortion or blistering problem.

Examples with octadecanol (mp 55° C.) (Henkel)

Example 7 (Inventive)

The same batch composition and die configuration were used as in Example 1 except octadecanol (40%) was used. The Brabender temperature was about 55° C. (mp of octadecanol) and the ram temperature at about 60° C. No wax separation was noted with a long mixing time of about 8 minutes, confirming that the Brabender temperature be set around the melting point of the wax to produce a uniform batch mixing without wax separation. The mixed batch yielded good ware quality, very comparable to that of sample (2) in Example 6 (8 min. mixing with hexadecanol), and a rapid setting effect slightly stronger than that of hexadecanol. The extrudate could be dried by a combination of dielectric and conventional ovens as a hexadecanol batch.

Example 8 (Inventive)

The same procedure and composition were used as in Example 7 except that the Brabender temperature was raised to about 60° C. Wax separation was observed beyond 2 minute mixing and the resulting honeycomb had a poor ware quality.

Example with Carbowax 4600 (mp 60° C.)

Example 9 (Comparative)

A mixture of oxide powders as in Example 1, but with about 3% Methocel A4M, and about 40% arbowax 4600 was readily mixed uniformly at room temperature. The mixed batch yielded a soft ware with a poor skin quality and no rapid-setting feature. This showed that an aqueous batch containing a water soluble wax was ineffective in generating any solidification trend (due to loss of melting feature of such wax in the presence of water). It also reaffirmed the uniqueness of a water insoluble, hydrophobic wax such as hexadecanol to be able to impart a strong rapid-setting feature in an aqueous cellulose ether and/or cellulose ether derivative batch.

Example with Shellwax 100 (mp 52° C.) paraffin wax (Shell Oil Co.)

Example 10 (Inventive)

The same batch composition and die configuration were used as in Example 1 except that about 40% Shellwax 100 was used and the Brabender and ram temperature was set at about 52° C. (mp of wax). An 8 minute mixing yielded a very uniform batch without any wax separation. A honeycomb product from such a mixed batch showed a good ware quality and rapid-setting effect stronger than that of a fatty alcohol batch.

Examples with Shellmax 500 (mp 61° C.) microcrystalline wax (Shell Oil Co.)

Example 11 (Inventive)

The same batch composition and die configuration was used as in Example 1 except that about 40% Shellmax 500 was used and the Brabender temperature was set at about 61° C., the mp of the wax, and the extrusion ram temperature was set at about 60° C. An 8 minute mixing yielded a very uniform batch without any wax separation. But a honeycomb product from such a batch extruded at a relatively high temperature of about 60° C. showed a collapsed skin section with poor cell knitting (voids) in the body due to the stickiness and softness of the batch at that temperature. However, the extrudate displayed a strong rapid setting effect.

Example 12 (Inventive)

The procedure of Example 11 was followed except that the ram temperature was set at about 52° C. instead of 60° C. The ware quality was still poor, similar to that of Example 11.

Example 13 (Inventive)

The procedure of Example 11 was followed except that the ram temperature was about 45° C. A honeycomb product from such a mixture showed a good ware quality without any collapsed skin or voids and a rapid setting effect similar to that of a Shellwax 100 batch, (Example 10). By lowering the extrusion temperature from about 60° C. to about 45° C. to eliminate the stickiness of a well-mixed batch, the ware quality was greatly improved as evidenced from the comparison between Example 11 and this example. Thus it is very important to set an appropriate ram temperature for obtaining a good ware quality from a well-mixed batch.

Example with Palmitic acid, Emersol 143 (mp 61° C.) fatty acid (Henkel)

Example 14 (Inventive)

The same batch composition and die configuration were used as those of Example 1 except that about 40% Emersol 143 was used and the Brabender temperature was set at about 61° C. (mp of wax) and the ram temperature was set at about 60° C. The mixing time was about 9 minutes. The 9 minute mixing yielded a very uniform batch without any wax separation. The resulting honeycomb product had a fair ware quality and a rapid setting effect stronger than that of paraffin wax.

Example with Myristic acid, Emery 654 (mp 53° C.) fatty acid (Henkel)

Example 15 (Inventive)

The same batch composition and die configuration was used as in Example 1 except that about 40% Emery 654 was used and the Brabender temperature was set for about 53° C. (mp of the wax) and the ram temperature was set at about 55° C. The mixing time was about 9 minutes which yielded a very uniform batch without any wax separation. The resulting honeycomb product had a fairly good ware quality and a rapid setting effect that was very close to that of a palmitic acid batch.

Examples with Mixed wax system myristic acid (mp 53° C.)/octadecanol (mp 55° C.) 1/1 weight ratio Example 16 (Inventive)

The same composition and die configuration was used as in Example 1 except that about 20% myristic acid Emery 654/20% octadecanol was used and the Brabender temperature was set at about 55° C. and the ram temperature at about 55° C. Mixing time was for about 12 minutes. The 12 minute mixing yielded a uniform batch without any wax separation. But a honeycomb product from such a batch at a high 55° C. showed a big void in the body due to the stickiness of the batch.

Example 17 (Inventive)

The same procedure as Example 16 was followed except that the ram temperature setting was at about 40° C. A honeycomb product from such a mixture showed a very good ware quality without any void in the body and a rapid-setting effect similar to that of a myristic acid batch (Example 15) which had only a fair skin quality. This example reconfirms the importance of setting an appropriate extrusion temperature for obtaining a good ware quality (see also Example 13). It also establishes that a mixed wax system can impart a synergistic effect in enhancing both rheology (for good skin) and rapid setting efficiency.

Example with Mixed wax system myristic acid (mp 53° C.)/octadecanol (mp 55° C.) weight ratio of about 3/1.

Example 18

The same batch composition and die configuration was used as in Example 1 except that about 30% Emery 654/10% octadecanol was used and the Brabender temperature was set at about 54° C. and the ram temperature was set at about 45° C. The mixing time was about 10 minutes which yielded a uniform batch without any wax separation. A honeycomb product from such a mixed batch showed a good ware quality and a rapid setting effect similar to that of a myristic acid batch. This example reconfirms that a mixed wax system can impart a synergistic effect in enhancing rheology and rapid-setting efficiency.

Example with Aldo PGHMS (mp 42° C.) fatty acid ester, propylene glycol high monostearate (Lonza)

Example 19

The same batch composition and die configuration was used as in Example 1 except that about 40% Aldo PGHMS was used and the Brabender temperature was set at about 42° C. and the ram temperature was set at about 40° C. The mixing time was about 7.5 minutes which yielded a uniform batch. A honeycomb product from such a mixed batch showed a good ware quality and a rapid setting effect close to that of a fatty alcohol batch.

Example with Pegosperse 50 MS (mp 58° C.) fatty acid ester, ethylene glycol monostearate (Lonza)

Example 20

The same batch composition and die configuration was used as in Example 1 except that about 40% Pegosperse was used and the Brabender temperature was set at about 58° C. and the ram temperature was set at about 50° C. The mixing time was about 8 minutes which yielded a uniform batch. A honeycomb product from such a mixed batch showed a good ware quality and a rapid setting effect close to that of a fatty alcohol batch.

Examples with Polywax 500 PE (mp 88° C.) polyethylene wax (Petrolite)

Example 21

A 20% wax in a batch having the same powder composition as Example 1 and having Methocel K75M with about 35% water was mixed in a Brabender set at about 60° C. for about 3 minutes to obtain a uniform batch. A honeycomb product 31 cells/cm$^2$/0.4 mm wall/0.4mm skin/2.54 cm diameter, (200 cpsi/16 mil wall/16 mil skin/1" diameter) with a fair skin and good knitting quality was obtained from that batch which was extruded in a ram extruder at about 60° C., showing a very strong rapid-setting effect (stronger than that of a fatty alcohol batch).

Example 22

The same composition and die configuration was used as in Example 21 except that 2.2% Vybar 260 was added as a plasticizer and mixing was for about 7 minutes. The mixed batch was uniform. A honeycomb product from such a mixed batch showed a good ware quality and very strong rapid-setting effect.

Example 23

The procedure of Example 22 was followed except that the plasticizer was Vybar 825 from Petrolite (1), dioctyl phthalate (2) and Flexricin P-3 from CasChem. Inc. (3). The same good results on ware quality and rapid-setting effect as those of Example 22 were obtained.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a homogeneous formable mixture comprising:

simultaneously mixing under shear, a water-insoluble wax, organic binder comprising components selected from the group consisting of methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and combinations thereof, powder material capable of being formed into a body when combined with the organic binder, and vehicle of which at least about 90 wt % is water, at a temperature which is at least high enough to soften the wax.

2. A method of claim 1 wherein the powder material is selected from the group consisting of ceramic, glass, glass ceramic, metal, molecular sieve, carbon, and combinations thereof.

3. A method of claim 2 wherein the powder material is ceramic material.

4. A method of claim 3 wherein the powder material is selected from the group consisting of cordierite, mullite, and combinations thereof.

5. A method of claim 2 wherein the powder material is metal.

6. A method of claim 5 wherein the metal is iron, Cr, and Al.

7. A method of claim 1 wherein the organic binder is selected from the group consisting of methylcellulose, methylcellulose derivatives, and combinations thereof.

8. A method of claim 7 wherein the organic binder is selected from the group consisting of methylcellulose, hydroxypropyl methylcellulose, and combinations thereof.

9. A method of claim 8 wherein the organic binder is a combination of a first hydroxypropyl methylcellulose having a methoxyl content of about 27 to 30 weight percent, and a second hydroxypropyl methylcellulose having a methoxyl content of about 19 to about 25 weight percent.

10. A method of claim 7 wherein the organic binder content is about 2.5% to about 8.0% by weight based on the inorganic powder components.

11. A method of claim 1 wherein the wax component has a melting point no greater than the thermal gel point of the organic binder.

12. A method of claim 1 wherein the wax component is selected from the group consisting of paraffin wax, microcrystalline wax, mineral wax, vegetable waxes, animal waxes, fatty alcohols, fatty acids, fatty acid esters, polyethylene wax, hydrogenated oils, ketones, amines, amides, chlorinated waxes, synthetic hydrocarbon waxes, metallic soaps, and mixtures thereof.

13. A method of claim 12 wherein the wax is selected from the group consisting of hexadecanol, octadecanol, paraffin wax, microcrystalline wax, polyethylene wax, palmitic acid, myristic acid, propylene glycol monostearate, ethylene glycol monostearate, and mixtures thereof.

14. A method of claim 1 wherein when the melting point of the wax is higher than the thermal gel point of the binder, a plasticizer is added to the mixture to lower the melting point of the wax.

15. A method of claim 1 wherein the wax component content is about 3% to 60% by weight based on the inorganic solid components.

16. A method of claim 1 comprising the additional steps of:
   a) shaping the mixture into a green body:
   b) drying the green body; and
   c) heating the green body at a temperature and for a time to form a final body.

17. A method of claim 16 wherein the mixture is shaped by extrusion.

18. A method of claim 17 wherein the mixture is shaped into a honeycomb.

19. A method of claim 18 wherein the mixture is extruded through an extruder that is in the temperature range of room temperature to the melting point of the wax.

20. A method of claim 16 wherein the mixture is shaped by injection molding.

21. A honeycomb body having no voids and a smooth skin, the body being produced by the method of claim 19.

* * * * *